US011144678B2

(12) United States Patent
Dondini et al.

(10) Patent No.: US 11,144,678 B2
(45) Date of Patent: Oct. 12, 2021

(54) SYSTEM WITH SECURE SOC CONNECTIONS AMONG IP AND MULTIPLE GPIOS, AND CORRESPONDING METHOD

(71) Applicants: STMICROELECTRONICS S.r.l., Agrate Brianza (IT); STMICROELECTRONICS (ROUSSET) SAS, Rousset (FR)

(72) Inventors: Mirko Dondini, Catania (IT); Gaetano Di Stefano, San Pietro Clarenza (IT); Sergio Abenda, Tremestieri Etneo (IT); Layachi Daineche, Gardanne (FR)

(73) Assignees: STMICROELECTRONICS S.r.l.; STMICROELECTRONICS (ROUSSET) SAS

( * ) Notice: Subject to any disclaimer, the term of this patent is extended or adjusted under 35 U.S.C. 154(b) by 619 days.

(21) Appl. No.: 15/916,067

(22) Filed: Mar. 8, 2018

(65) Prior Publication Data

US 2018/0260585 A1 Sep. 13, 2018

(30) Foreign Application Priority Data

Mar. 9, 2017 (EP) .................................... 17305250

(51) Int. Cl.
*H04L 9/00* (2006.01)
*G06F 21/85* (2013.01)
(Continued)

(52) U.S. Cl.
CPC .......... *G06F 21/85* (2013.01); *G06F 13/4068* (2013.01); *G06F 21/606* (2013.01); *G06F 21/71* (2013.01); *G06F 21/76* (2013.01)

(58) Field of Classification Search
CPC ...................................................... G06F 21/85
(Continued)

(56) References Cited

U.S. PATENT DOCUMENTS 6,138,240 A 10/2000 Tran et al.
8,370,605 B2 2/2013 Nejah et al.
(Continued)

FOREIGN PATENT DOCUMENTS

CN 102752104 A 10/2012
CN 103077362 A 5/2013
(Continued)

OTHER PUBLICATIONS

Extended European Search Report, dated Sep. 8, 2017, for European Application No. 17305250.7-1870, 7 pages.

*Primary Examiner* — Christopher J Brown
(74) *Attorney, Agent, or Firm* — Seed IP Law Group LLP

(57) ABSTRACT

An integrated circuit includes one or more intellectual property (IP) cores, one or more general purposes input/output (GPIO) interfaces, each GPIO interface having one or more ports, and one or more security circuits, each security circuit being coupled between an IP core and a GPIO interface. A security circuit, in operation, selectively enables communications between the IP core and the GPIO interface coupled to the security circuit based on an indication of the security status of the IP core, an indication of the security status of the GPIO interface or both the indication of the security status of the IP core and the indication of the security status of the GPIO interface.

24 Claims, 8 Drawing Sheets

(51) Int. Cl.
*G06F 21/76* (2013.01)
*G06F 21/60* (2013.01)
*G06F 13/40* (2006.01)
*G06F 21/71* (2013.01)

(58) Field of Classification Search
USPC .......................................................... 726/17
See application file for complete search history.

(56) References Cited

U.S. PATENT DOCUMENTS

| | | | |
|---|---|---|---|
| 8,427,193 B1 * | 4/2013 | Trimberger .......... | H03K 19/003 326/8 |
| 2003/0108205 A1 * | 6/2003 | Joyner .................. | H04L 9/0825 380/277 |
| 2007/0168574 A1 * | 7/2007 | Martinez ............... | G06F 21/554 710/15 |
| 2014/0082237 A1 | 3/2014 | Wertheimer et al. | |
| 2014/0137231 A1 * | 5/2014 | Sastry .................. | G06F 13/385 726/16 |
| 2016/0180114 A1 * | 6/2016 | Sastry .................. | H04L 9/0643 713/189 |

FOREIGN PATENT DOCUMENTS

| | | | |
|---|---|---|---|
| CN | 104135410 A | 11/2014 | |
| CN | 204066121 U | 12/2014 | |
| CN | 106250725 A | 12/2016 | |

\* cited by examiner

SYSTEM WITH SECURE SOC CONNECTIONS AMONG IP AND MULTIPLE GPIOS, AND CORRESPONDING METHOD

BACKGROUND

Technical Field

The present disclosure relates to electronic circuits, such as systems or circuits having System on Chip (SoC) connections, systems or circuits having connections between Intellectual Property (IP) cores and General Purpose Input/Output (GPIO) entities or interfaces, etc.

Description of the Related Art

A number of applications contexts, increasingly diffused with the general consumer public, involve so-called "smart" applications.

By way of example, one may refer to:
home automation ("domotics") applications, for example for the control of appliances, installations, and the like e.g., through mobile devices in "smart" homes;
automotive applications, for example for electronic systems in a "smart car", possibly including software upgrade.

A reasonable level of security in data transfer between two devices (e.g., reducing the risk that the signals exchanged on a secure connection established between an IP and a GPIO may be undesirably corrupted) may represent an asset for these applications.

More generally, new application scenarios being developed, e.g., in the area of the Internet of Things (IoT) or in the automotive field, make reasonable protection of data and code from potential malicious software attacks an interesting feature. This trend may also lead to stronger design challenges also for general-purpose products, like micro-controllers.

BRIEF SUMMARY

An embodiment may facilitate improving "smart" applications, e.g., in terms of improved robustness of a SoC, with security coverage extended from start/end communication points (IP's, GPIO's) to the communication routes made available e.g., by an IP-to-multiple GPIO's de-multiplexing feature.

One or more embodiments may be applied in various technical contexts, such as application-dependent System-on-Chip (SoC) contexts.

One or more embodiments may reduce the risk that malicious software attacks may corrupt information exchanged over an established link between an IP and a GPIO.

One or more embodiments may also be used in other technical contexts wherein the inherent flexibility may be exploited by means of functional hardware partitions: interconnections between digital Intellectual Properties (IP's) and General Purpose Input/Output pads (GPIO's) within inside a System-On-Chips (SoC) architecture, and the information exchanged on these hardware links are exemplary of such applications.

One or more embodiments may facilitate complying with various different application requirements, e.g., in products targeting general-purpose markets, such as SoC Microcontrollers.

In one or more embodiments, this may involve implementing hardware capabilities for routing inputs/outputs of each IP to a number of GPIOs on board side (for example via IP de-multiplexing).

In one or more embodiments, software running on an embedded core may select which one out of multiple IP-GPIOs routes will be used for exchanging information with external components. This feature may offer increased flexibility, e.g., from an IP viewpoint, by providing a certain IP with the possibility of being connected to different GPIO's, while offering, from a GPIO viewpoint, the possibility of being accessible from different IPs.

One or more embodiments may facilitate avoiding that data transmission from a secure IP output to a secure GPIO element, on a selected IP-GPIO connection, may be "attacked" by exploiting another route from the set made available by the multiple GPIO's connection.

One or more embodiments may facilitate avoiding that data transmission from a secure GPIO element to a secure IP input, on a selected IP-GPIO connection, may be "corrupted" by malicious software by forcing data through another route of the set made available by the multiple GPIO's connection.

In comparison with known approaches, one or more embodiments may offer one or more of the following advantages:
a de-multiplexing feature may be applied to all IPs in the SoC system;
extended flexibility for secure IP mapping on GPIO controllers and GPIO's;
extended flexibility for non-secure IP's mapping on GPIO controllers and GPIO's;
reduced limitations on resource availability with different package options and compatibility with previous product families;
scalability at the SoC level, due to its applicability to all or just one or more subsets of IP's and GPIO's, as a function of application requirements.

Additionally, one or more embodiments may enhance the flexibility in coverage of current security architecture frameworks (ARM TrustZone, for example), thanks to the extension to IP-GPIO data-paths, which may be of interest for general purpose products, like micro-controllers, with some differences with respect to ASIC's and special purpose products.

Other features of interest of one or more embodiments may include:
portability across different security architectures, due to one or more embodiments being independent of specific solutions and/or provider;
"openness" to programmability, e.g., with the possibility of changing dynamically IP-GPIO data-path security configurations;
possibility of implementation as a low-cost global solution, with area and timing advantages of a hardwired IP de-multiplexing feature retained.

In one or more embodiments, the possibility of allowing or denying connection of an IP towards its possible reachable GPIO's made available e.g., through de-multiplexing possible paths, according to the status of start and end points of each connection (IP and GPIO) may represent a feature of interest. Such a feature may be of interest e.g., for SoC's supporting multiple packages and pin count options. For example, such a solution may allow software-controlled system re-configuration, with interest for this feature spanning from low-cost, low-power applications to high-performance, full-connectivity applications.

In an embodiment, a system comprises secure link connections, including communication channels between Intellectual Property entities and multiple General Purpose Input/Output entities, wherein said secure link connections are achieved by means of hardware components configured to decide if a connection between a source and a destination is allowed or denied, in one or both directions, wherein said decision is taken on the basis of a security information status of the source and destination. In an embodiment, said source is an Intellectual Property entity and said destination is a General Purpose Input/Output entity, or vice-versa. In an embodiment, said hardware components are inserted in each connection or communication channel between a source and a destination. In an embodiment, said hardware components are configured to control, via a de-multiplexing feature, the secure connections in both directions, either from a source to a destination and from a destination to a source. In an embodiment, said security information status of the source and destination of the secure link connections are provided by blocks included in the security hardware infrastructure of the system. In an embodiment, a first block defines the secure/non-secure status of the Intellectual Property entities of the system eligible for use by applications running in a secure environment, and a second block provides the secure/non-secure status of the General Purpose Input/Output entities. In an embodiment, both the first and the second blocks are programmable by software. In an embodiment, said hardware components include logical control circuits comprising logical ports. In an embodiment, the system is a System on Chip.

In an embodiment, a method of operating a system includes combining secure/non-secure status information and controlling secure link connections under the following conditions: allowing propagation of information between an Intellectual Property and a General Purpose Input/Output, if both of them are configured as secure; allowing propagation of information between an Intellectual Property and a General Purpose Input/Output, if both of them are configured as non-secure; denying propagation of information between an Intellectual Property and a General Purpose Input/Output, if the Intellectual Property is configured as secure but the General Purpose Input/Output is non-secure; and denying propagation of information between an Intellectual Property and a General Purpose Input/Output, if the General Purpose Input/Output is configured as secure but the Intellectual Property is non-secure.

In an embodiment, an integrated circuit comprises: one or more intellectual property (IP) cores; one or more general purposes input/output (GPIO) interfaces, each GPIO interface having one or more ports; and one or more security circuits, each security circuit being coupled between an IP core and a GPIO interface, wherein a security circuit, in operation, selectively enables communications between the IP core and the GPIO interface coupled to the security circuit based on an indication of the security status of the IP core, an indication of the security status of the GPIO interface or both the indication of the security status of the IP core and the indication of the security status of the GPIO interface. In an embodiment, the security circuit is part of a bi-directional communication channel between the IP core and the GPIO interface. In an embodiment, the security circuit, in operation, selectively enables communications between the IP core and a port of the GPIO interface in both directions. In an embodiment, the GPIO interface has a plurality of ports and, in operation, performs multiplexing/demultiplexing with respect to the plurality of ports. In an embodiment, each communication channel between one of the IP cores and one of the GPIO interfaces includes one of the security circuits. In an embodiment, the integrated circuit comprises one of more memories coupled to the one or more security circuits, wherein, in operation, the one or more memories store indications of the security statuses of the one or more IP cores and indications of the security statuses of the one or more GPIO interfaces. In an embodiment, a memory of a security control circuit stores the indications of the security statuses of the one or more IP cores and memories of GPIO control circuits of the GPIO interfaces store the indications of the security statuses of the one or more GPIO interfaces. In an embodiment, the indications of the security statuses of the one or more IP cores and the indications of the security statuses of the one or more GPIO interfaces are software-programmable. In an embodiment, each of the one or more ports of the GPIO interface has a respective security status and the security circuit, in operation, selectively enables a communication between the IP core and a port of the GPIO interface based on a security status of the port. In an embodiment, said security circuits include digital logic circuits. In an embodiment, the integrated circuit is a System on Chip (SoC). In an embodiment, the security circuit, in operation: enables communication between the IP core and the GPIO interface when the indication of the security status of the IP core indicates the IP core is secure and the indication of the security status of the GPIO interface indicates the GPIO interface is secure; enables communication between the IP core and the GPIO interface when the indication of the security status of the IP core indicates the IP core is not secure and the indication of the security status of the GPIO interface indicates the GPIO interface is not secure; disables communication between the IP core and the GPIO interface when the indication of the security status of the IP core indicates the IP core is secure and the indication of the security status of the GPIO interface indicates the GPIO interface is not secure; and disables communication between the IP core and the GPIO interface when the indication of the security status of the IP core indicates the IP core is not secure and the indication of the security status of the GPIO interface indicates the GPIO interface is secure. In an embodiment, the security circuit is coupled between the IP core and a second GPIO interface of the one or more GPIO interfaces, and the security circuit, in operation, selectively enables communications between the IP core and the second GPIO interface coupled to the security circuit based on the indication of the security status of the IP core, an indication of the security status of the second GPIO interface or both the indication of the security status of the IP core and the indication of the security status of the second GPIO interface. In an embodiment, the security circuit is coupled between a second IP core of the one or more IP cores and the GPIO interface, and the security circuit, in operation, selectively enables communications between the second IP core and the GPIO interface coupled to the security circuit based on an indication of the security status of the second IP core, the indication of the security status of the GPIO interface or both the indication of the security status of the second IP core and the indication of the security status of the GPIO interface. In an embodiment, the indication of the security status of the GPIO interface comprises indications of the security status of the one or more ports of the GPIO interface.

In an embodiment, a system comprises: an integrated circuit, including: one or more intellectual property (IP) cores; one or more general purposes input/output (GPIO) interfaces, each GPIO interface having one or more ports; and one or more security circuits, each security circuit being coupled between an IP core and a GPIO interface, wherein a security circuit, in operation, selectively enables communications between the IP core and the GPIO interface coupled to the security circuit based on an indication of the security status of the IP core, an indication of the security status of the GPIO interface or both the indication of the security status of the IP core and the indication of the security status of the GPIO interface; and a peripheral device coupled to a port of the GPIO interface. In an embodiment, the peripheral device is a wireless communication circuit. In an embodiment, the peripheral device is an automotive sensor. In an embodiment, the security circuit, in operation, selectively enables communications between the IP core and the GPIO interface in both directions. In an embodiment, each communication channel between one of the IP cores and one of the GPIO interfaces includes one of the security circuits. In an embodiment, the integrated circuit comprises a System on Chip (SoC).

In an embodiment, a method comprises: receiving, by a security circuit of an integrated circuit coupled between an intellectual property (IP) core of the integrated circuit a General Purpose Input/Output (GPIO) interface of the integrated circuit, an indication of the security status of the IP core; receiving, by the security circuit, an indication of the security status of the GPIO interface; and selectively enabling, by the security circuit, communications between the IP core and the GPIO interface based on the received indication of the security status of the IP core, the received indication of the security status of the GPIO interface or both the received indication of the security status of the IP core and the received indication of the security status of the GPIO interface. In an embodiment, a method comprises: enabling communication between the IP core and the GPIO interface when the indication of the security status of the IP core indicates the IP core is secure and the indication of the security status of the GPIO interface indicates the GPIO interface is secure; enabling communication between the IP core and the GPIO interface when the indication of the security status of the IP core indicates the IP core is not secure and the indication of the security status of the GPIO interface indicates the GPIO interface is not secure; disabling communication between the IP core and the GPIO interface when the indication of the security status of the IP core indicates the IP core is secure and the indication of the security status of the GPIO interface indicates the GPIO interface is not secure; and disabling communication between the IP core and the GPIO interface when the indication of the security status of the IP core indicates the IP core is not secure and the indication of the security status of the GPIO interface indicates the GPIO interface is secure. In an embodiment, the method comprises: retrieving the indication of the security status of the IP core from a memory of a security control circuit; and retrieving the indication of the security status of the GPIO interface from a control circuit of the GPIO interface. In an embodiment, the method comprises: updating the indication of the security status of the integrated circuit; and updating the indication of the security status of the GPIO interface.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments of the present description. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The references/headings provided herein are for convenience only and do not interpret the scope or meaning of the embodiments.

Figure 1:
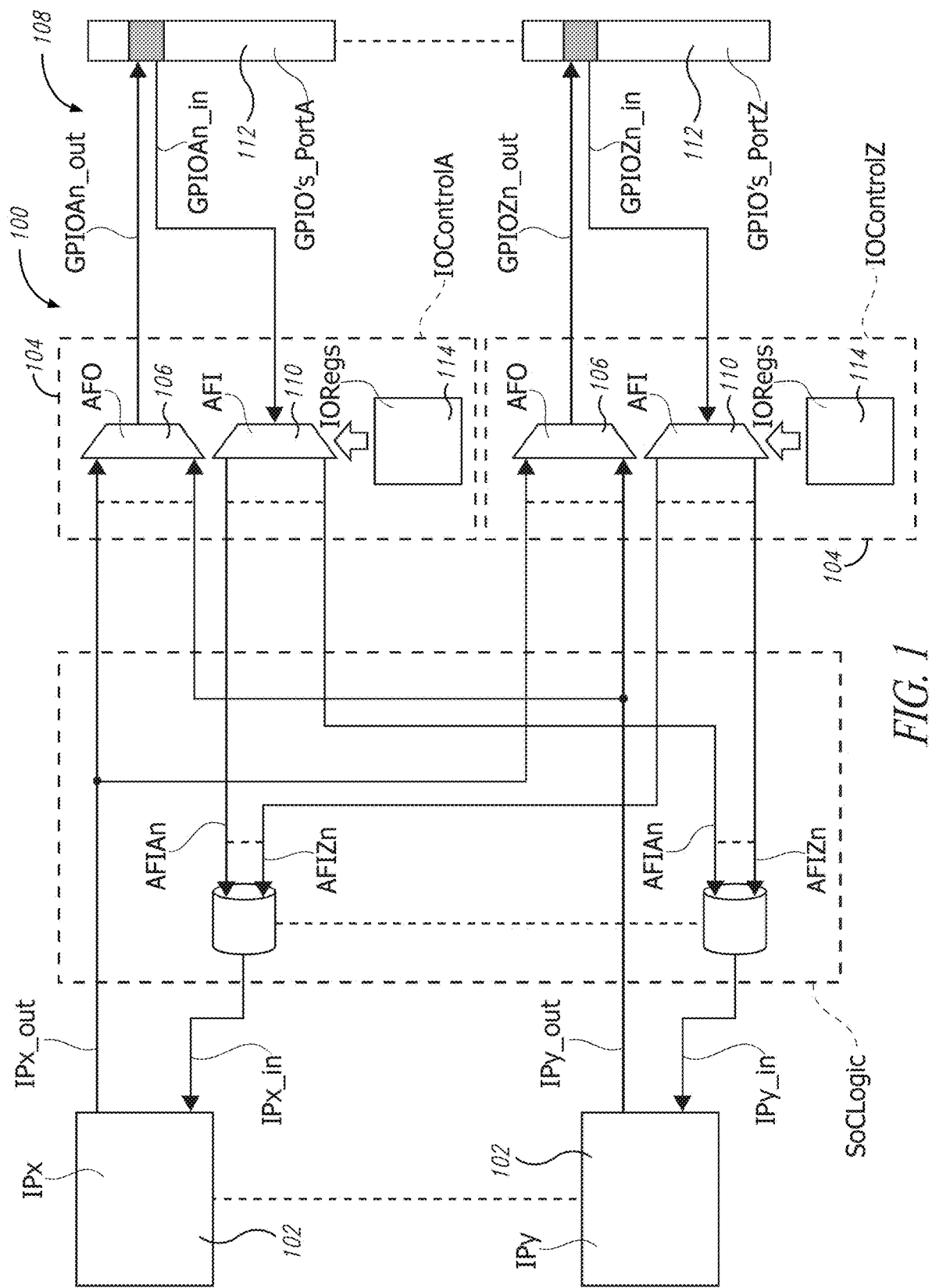
FIGS. 1, 2, 3 are diagrams exemplary of possible contexts of use of one or more embodiments.

FIG. 1 is generally illustrative of a circuit 100 including IP-to-GPIO (IP=Intellectual Property; GPIO=General Purpose Input/Output) data-paths.

In such an arrangement, considering e.g., IPx 102 as a reference, its output IPx_out may be physically connected to several Digital IO controllers 104 (IOControl blocks or circuits), such as for example IOControlA . . . IOControlZ, which may be responsible for managing register driving and signal routing for a GPIO interface 108.

For instance a Digital IO Controllers IOControl block 104 may implement the selection of different data sources received as an input. The selection may be achieved e.g., through multiplexing via AFO (Alternate Function in Output) blocks or circuits 106, as connected to a specific GPIO output, indicated as GPIOAn_out coupled to GPIO's_PortA 112, . . . GPIOZn_out coupled to GPIO'sPortZ 112.

A signal IPx_in sent as an input to the IPx block or circuit 102 may be selected among various possible data sources available, e.g., as coming from the IOControl blocks 104.

In this case, the IOControl blocks 104 may perform GPIO input de-multiplexing through AFI (Alternate Function in Input) blocks or circuits 110 to different destinations GPIOAn_in . . . GPIOZn_in.

Similar considerations apply for e.g., a block or circuit IPy 102 shown in the figure.

The selection logic in the GPIO Controllers 104 for multiplexing/de-multiplexing data sources may be controlled by programmable register blocks or circuits IORegs 114 that facilitate software control of the IP-GPIO signal routing.

For instance, a software control capability already available in the GPIO Controllers 104 (in connection with the fact that communication may be active only between one source and one destination) may facilitate a low-cost implementation of the IP de-multiplexing feature.

The IP output may be connected directly to the GPIO Controllers (without the need of any selection logic) and the IP input may be obtained as a hardwired OR combination of possible inputs coming from the GPIO Controllers (that is without any selection logic needed, because there is only one input active at any time).

This may facilitate achieving IP-to-GPIO Controller datapaths that are, at the same time, faster and area-saving.

Meeting reasonable security requirements (and intended extension of security coverage to the IP-GPIO data-paths) may be facilitated by an approach where the start and end points of a communication channel (i.e., the IP's and the GPIO's respectively) are made secure.

For example, this approach may involve implementing two hardware components:
- a Security/Protection Digital IO Controller, programmable by a (secure) software application, that qualifies which ones of IPs in the Soc will be considered secure and not secure, respectively, and
- GPIO Digital IO Controllers (such as the IOControl blocks of FIG. 1, each managing a group of GPIO's) programmable by secure software applications, e.g., via embedded registers, such as IORegs of FIG. 1, in order to distinguish between secure and non-secure GPIO's.

It was observed that, while effective for a single, point-to-point connection between IP and GPIO, such a solution may turn out to be inadequate with a SoC architecture, wherein IP-to-multiple GPIO's connectivity may be desirable, as in the case of a general purpose micro-controller.

Figure 2:
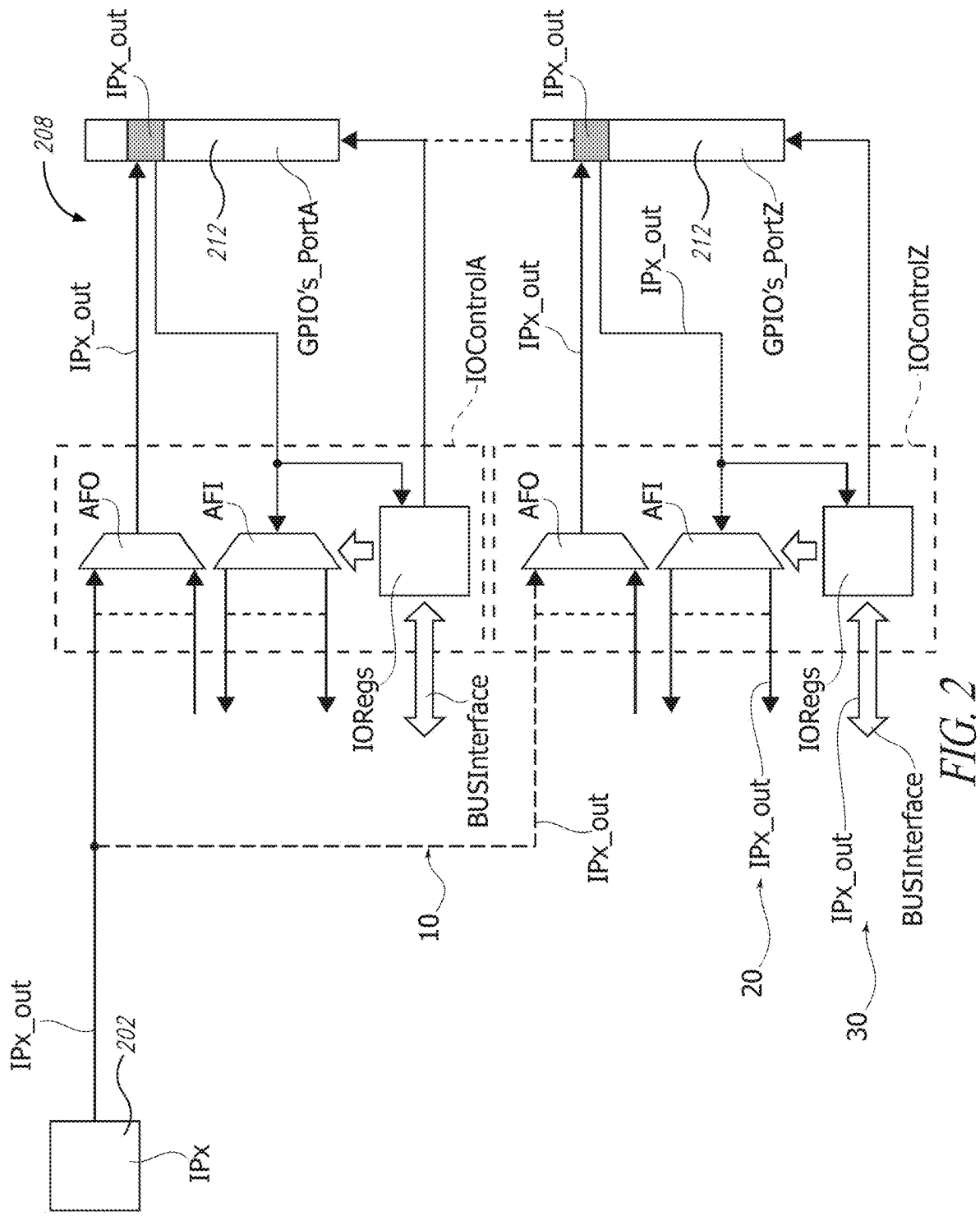

As shown in FIG. 2, the output of a secure IP, like for example IPx 202, may be routed both to a secure GPIO 208 (for example the one belonging to PortA 212) and to other GPIO's that can be non-secure (for example IO's on PortZ 212).

For instance, FIG. 2 shows a hypothetical secure output "spying" scenario through a non-secure connection. Moreover, the signal IPx_out on a path such as 10 may represent a secure data over a non-secure route; this means that a malicious software could be able to spy information transmitted over an "assumed" secure connection by programming the Digital IO Controller, like IOControlZ, of a non-secure GPIO in order, for example, to force the IO to feed back data received towards its input channel and allowing the Digital IO Controller to store it in the internal registers. In addition, malicious software can read the secure data by accessing the register through bus interface. The information over the line 20 may thus be read by software through a non-secure IP, while the information over the line 30 may be readable by software through register access.

Figure 3:
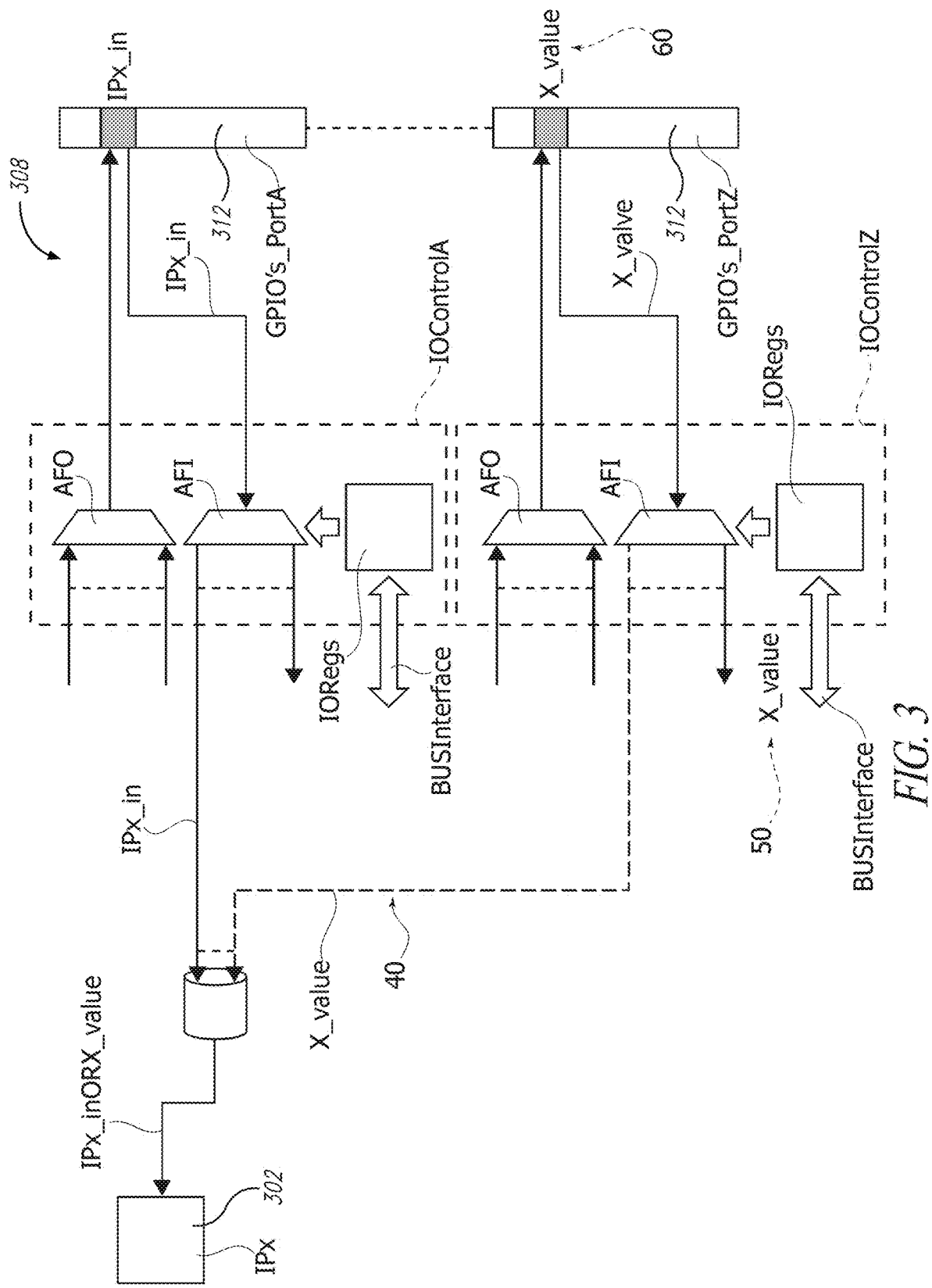

In addition, as shown in FIG. 2, the input of a secure IP, like for example IPx, may be represented not only by the signal coming from the secure GPIO, through IOControlA, but also by the hardwired combination of all the possible inputs from the GPIO's the IP is connected to. FIG. 3 shows a secure input corruption scenario through non-secure connection (for example, the IO on PortZ 312 in the FIG. 3).

If one assumes that only one input may be active at a time, a malicious software may be able to corrupt information transmitted over the assumed secure connection, from GPIO 308 to IPx 302, by acting on the configuration of a IO Digital Controller of a non-secure GPIO, in order to force another data, for example the X_value on a line 40, which may represent corrupting/corrupted data over a non-secure route (for example the IP input). This corrupted value X_value can came directly from the board, as indicated by reference 60, or from data written by malicious software through Digital IO Controller internal registers, as indicated by reference 50.

A possible approach in solving potential security issues related to an IP hardwired de-multiplexing feature, may involve connecting certain IPs, as required for secure connection, to only one of the available Digital IO Controllers and providing a fully secure architecture with all the GPIO's it controls.

This solution may be helpful in avoiding secure transmission corruption and/or data spying but at the cost of:
- removing the de-multiplexing feature on some SoC IPs,
- reduced (virtually, lack of) flexibility in the IP-GPIOs mapping, because some IPs are mapped with a well specified Digital IO Controller,
- reduced (virtually, lack of) system configurability, because non-secure IPs with a de-multiplexing feature cannot be mapped onto Digital IO Controller and related GPIO's dedicated to secure IP's,
- limitations in resources available with different package options, and
- potential compatibility issues with previous product families where these IP-GPIO mapping limitations are not present.

Another approach may involve replacing hardwired implementations of IP de-multiplexing features with a programmable multiplexer-based solution, controlled by secure registers, with the aim of performing a controlled selection of IP input/output routing with GPIO Controllers, avoiding risks as discussed previously.

Although interesting from a logical viewpoint, this solution may end up by being expensive in terms of area requirements and timing performance degradation. These factors—in combination with the fact that a certain logic is already in place (e.g., embedded) in the GPIO Controllers—make such an approach less attractive from the SoC design perspective.

One or more embodiments may provide a system including secure link connections, which are communication channels defined among Intellectual Property (IP) entities and multiple General Purpose Input/Output (GPIO) entities.

In one or more embodiments, secure link connections may be provided by means of hardware components or circuits which are able to decide if a connection between a source and a destination can be established (that is, should be allowed) or not (that is, denied or forbidden), in one or both directions.

In one or more embodiments, such a decision may be taken on the basis of the security information status of the source and destination.

Figure 4:
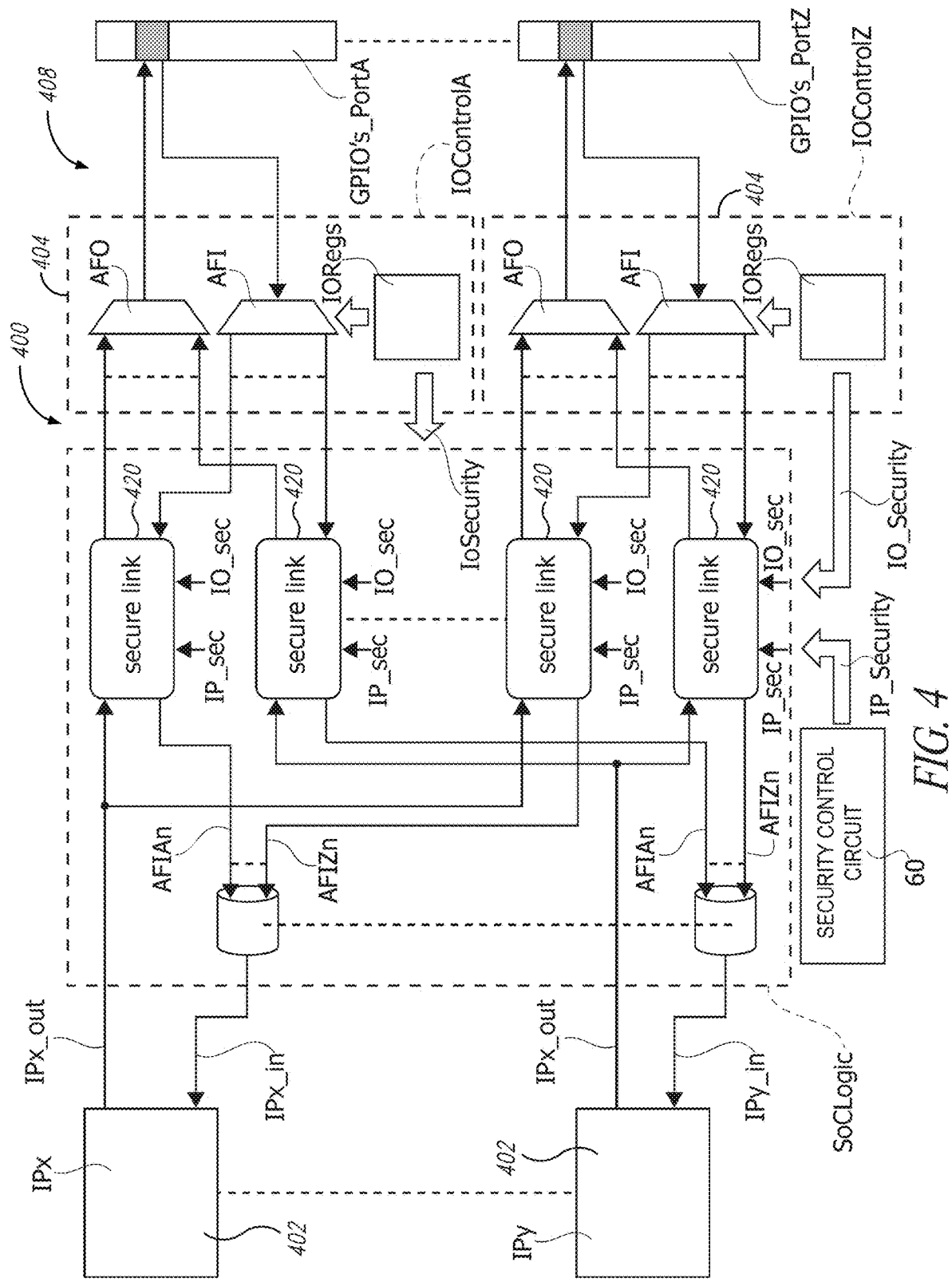
FIG. 4 is a diagram exemplary of an embodiment of a SoC system embedding secure link components.

FIG. 4 shows a schematic overview of IP-GPIO connections in a SoC sub-system 400 embedding Secure Link hardware components to facilitate achieving security integrity.

In one or more embodiments, as exemplified in FIG. 4, such a sort of "gating" control may be performed through the application of an hardware component or circuit (Secure Link 420) that may receive security information on an IP 402 and a related GPIO 408 and decide if the connection between the two entities could be established (allowed) or should be forbidden (denied), in either direction.

In the following, a first situation will be described by referring by way of example to a scenario involving a security application context.

In one or more embodiments, a Secure Link component as discussed in the foregoing may be inserted in each connection between an IP and the corresponding GPIO's. In particular, thanks to de-multiplexing feature, the Secure Link component may control connections in both directions, i.e., the IP-to-GPIO and GPIO-to-IP paths.

In one or more embodiments, this control may be dependent on the security status of the source and the destination of the communication channel (IP or GPIO, according to the transmission direction).

In one or more embodiments, that information may be provided by some blocks or circuits already available in the security hardware infrastructure of a current SoC systems, that needs only to be fed to the Secure Link instances: the Security (Protection) Controller or circuit 60 and the GPIO's Controllers 404.

In one or more embodiments, the Security Controller 60 may define the secure/non-secure status of each IP in the SoC eligible for usage by applications running in a secure environment. This status, at the output of the Security Controller 60 is indicated in the figures by the label IP_Sec or IPSecurity.

In one or more embodiments, the GPIO Controllers 404 provide secure/non-secure status of each GPIO, through its registers. This status is indicated in the figures by the label IO_sec or IOSecurity.

In one or more embodiments, both the Security Controller 60 and the GPIO Controllers may be programmable by software.

In one or more embodiments, by combining the information available, each Secure Link block 420 may operate under conditions such as, e.g.:

allowing propagation of information between an IP and a GPIO, if both of them are configured as secure;
allowing propagation of information between an IP and a GPIO, if both of them are configured as non-secure;
denying propagation of information between an IP and a GPIO, if the IP is configured as secure but the GPIO is non-secure; and
denying propagation of information between an IP and a GPIO, if the GPIO is configured as secure but the IP is non-secure.

The scenario discussed in the foregoing provides a functional description of a possible implementation of the Secure Link component.

In one or more embodiments, a Secure Link block 420 can be defined according to the requirement of the application context in which is encapsulated.

Figure 5:
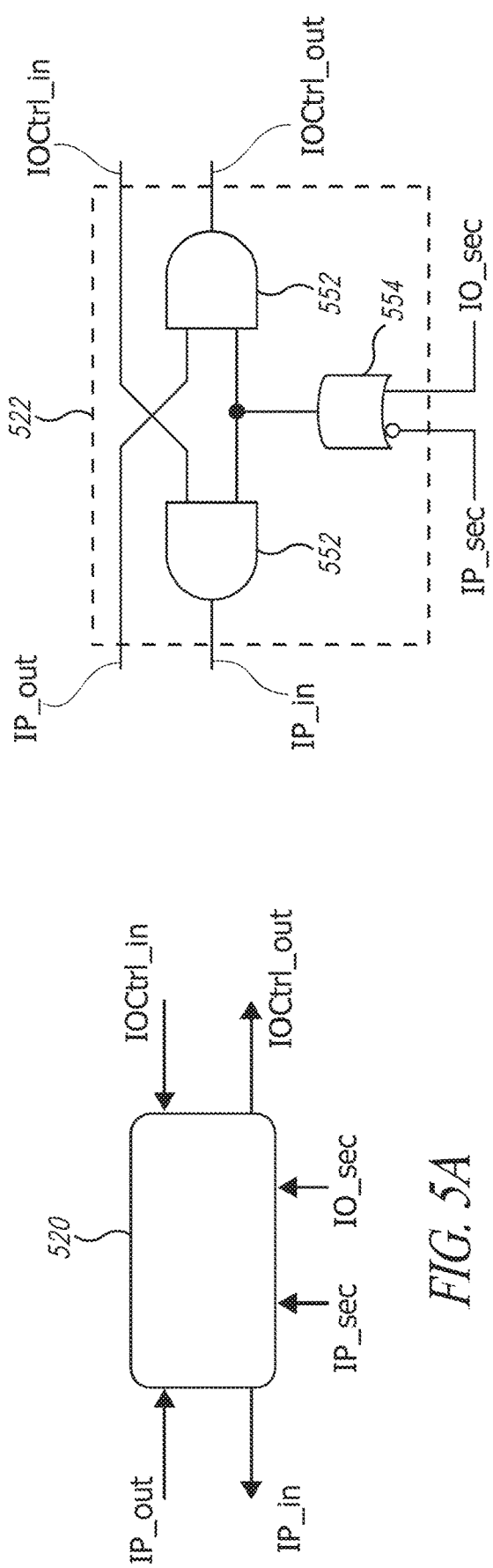
FIGS. 5A, 5B and 5C are exemplary of a possible implementation of certain details of the SoC system of FIG. 4.

As an example, FIG. 5A shows a Secure Link block 520 with inputs and outputs, FIG. 5B shows a Secure Link low-cost implementation (reduced gate count) 522, and FIG. 5C shows an associated logical truth table 524.

In particular, FIG. 5B shows a logical control circuit, which comprises two AND logical ports 552 and an OR logical port 554. More in detail, each of the two AND logical ports 552 receives as a first input the signal IP out or the signal IOCtrl_IN, and as second input the output of the OR logical port 554. The OR logical port 554 receives in input the signal IP_sec inverted and the IO_sec signal.

In particular, the Secure Link block gives as outputs the following signals:

$$IP\_in = (IOCtrl\_in) \text{ AND } (\overline{IP\_sec} \text{ OR } IO\_sec)$$

$$IOCtrl\_out = (IP\_out) \text{ AND } (\overline{IP\_sec} \text{ OR } IO\_sec)$$

The truth table in FIG. 5C shows the value of the output of the Secure Link block 522, in which communication between IP and GPIO is allowed not only when both IP and GPIO are secure or not secure, but also in the case of non-secure IP connected to secure GPIO.

This implementation may be based on the assumption that the GPIO Controller (See GPIO controller 404 of FIG. 4), which has the control of the GPIO status, is able to avoid connection between that IP and the secure GPIO, through the action of the internal multiplexing logic dedicated to the secure GPIO. In particular, the internal multiplexing logic dedicated to the secure GPIO is managed by programmable secure registers, thus acting under the control of secure software.

As already mentioned, the Secure Link components do not need to be placed on every IP-GPIO physical link, but may be implemented (only) on those connections that could interface with start and end points exposed to potentially different security status during application execution.

For example, IP and GPIO's with the same secure/non-secure status transitions do not need to be protected by a Secure Link block.

Moreover, non-secure GPIO's expected never to be connected to secure IP's do not need to be protected by a Secure Link block.

In addition, a non-secure IP expected never to be connected to secure GPIO's does not need to be protected by the Secure Link block.

This usage flexibility allows a system based on a Secure Link block concept to cover a wide spectrum of applications in which security is needed, from full general purpose, where all the possible IP-GPIO's connections are equipped with the Secure Link components, to low cost or special purpose cases, where a specific subset of IP's and GPIO's is selected to be security aware and therefore protected via the Secure Link block.

Figure 6:
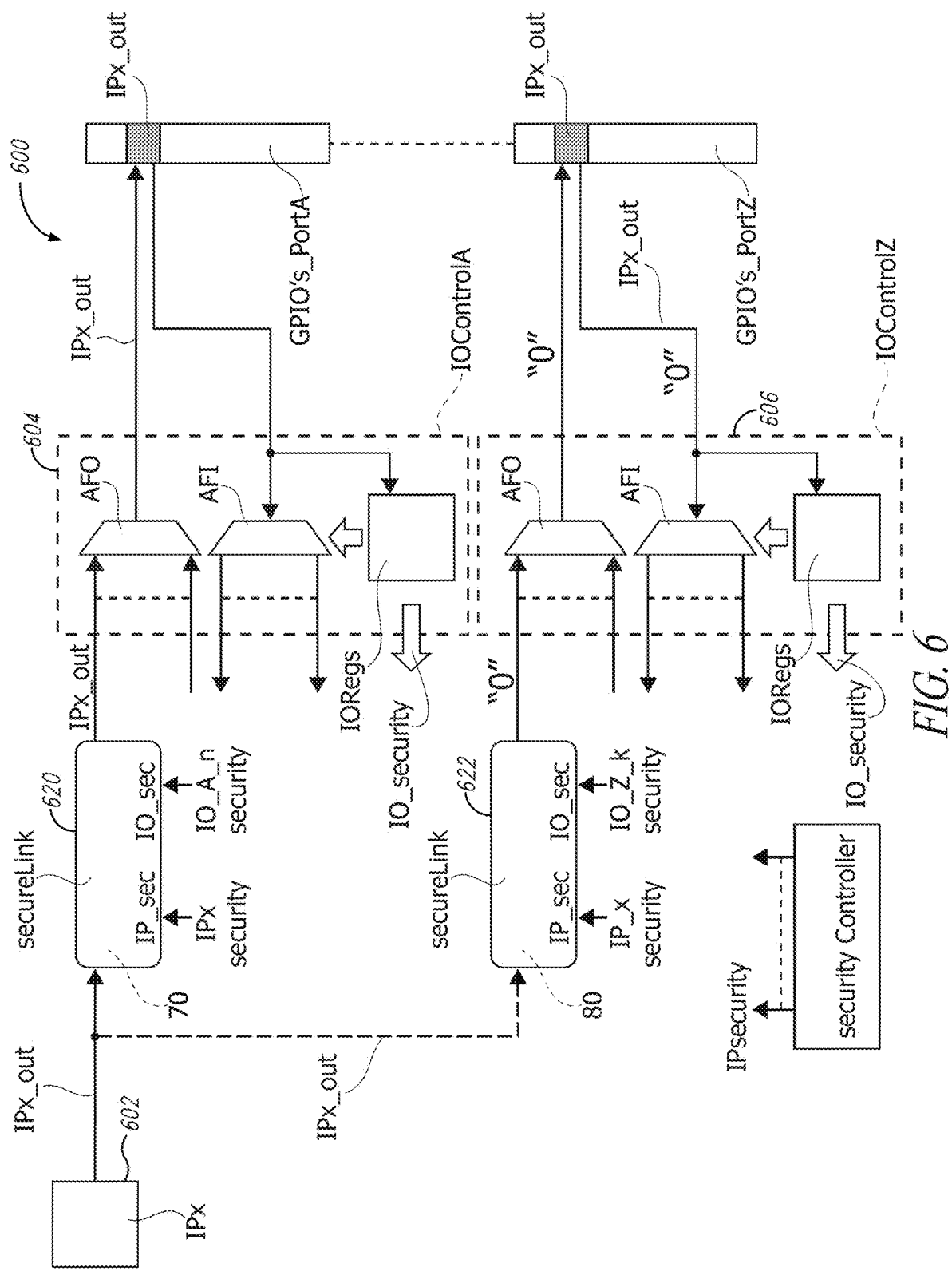
FIG. 6 is an exemplary embodiment of protection of a SoC system against a malicious attack.

FIG. 6 shows another example of a SoC system 600 based on a Secure Link concept.

For instance, FIG. 6 shows how a Secure Link block or circuit 620, 622 may protect a SoC against a possible attack carried out by means of malicious software trying to detect data transmission over a secure connection. The example assumes IPx and IO_A_n are secure, while IO_Z_k and related controller IOControlZ are non-secure.

In particular, the first Secure Link block or circuit 620 may allow, e.g., at 70 the propagation of the secure data over the channel, while the second Secure Link block or circuit 622 may deny, e.g., at 80 the propagation of secure data over the channel.

According to the information on the security status of IPx 602 and GPIO 604 (e.g., IO_A_n), said status being provided respectively by the Security Controller 660 and the GPIO Controller 604 (for example IOControlA), the associated Secure Link block 620 may allow at 70 communication between the two entities, having recognized them as both secure. At the same time, the Secure Link component 622 placed on the other connection available towards IPx_out, thanks to de-multiplexing feature, may performs a same check and block at 80 propagation of IPx_out towards GPIO (IO_Z_k), through the GPIO Controller 606 (IOControlZ), having recognized the latter as non-secure. For instance, the output of the second Secure Link block 622 may be set to "0" for that purpose.

In this way, the IPx output will not reach the non-secure GPIO Controller and will not be open to detection by malicious software acting, e.g., on the programmable registers of said GPIO.

Figure 7:
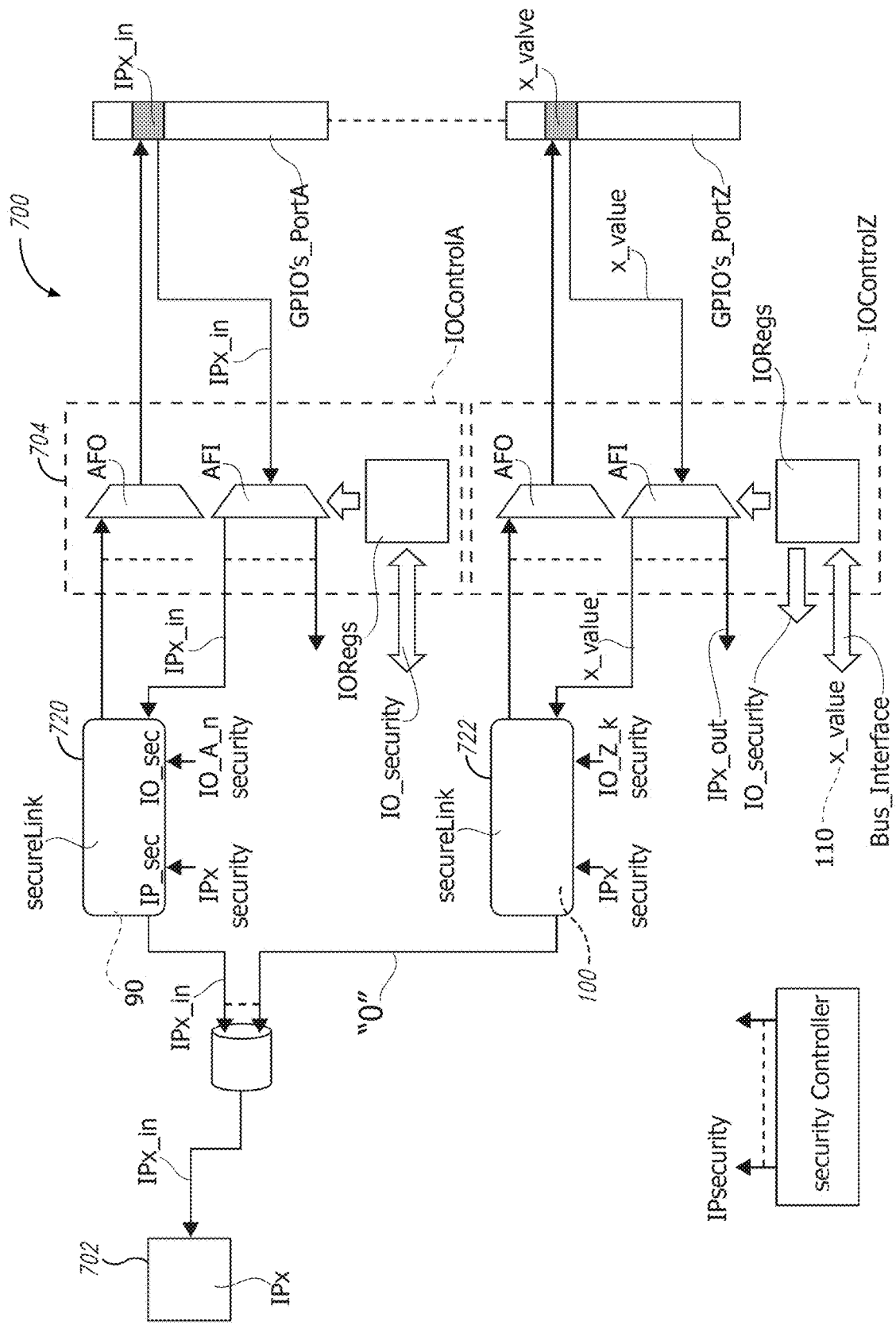
FIG. 7 is an exemplary embodiment of protection of a SoC system against data corruption.

FIG. 7 shows still another scenario wherein a SoC system 700 may be protected against possible attacks carried out by means of malicious software trying to corrupt data transmission over a secure connection by using a Secure Link block 720, 722.

In one or more embodiments as exemplified in FIG. 7, a Secure Link component 720 placed on the connection between IO_A_n GPIO 704 and IPx 702 may allow communication at 90, due to secure status of both; conversely, a Secure Link block 722 placed on the IO_Z_n GPIO and IPx connection may block at 100 data transmission between the two, due to the IO_Z_n non-secure status, thus avoiding that potential corrupting data (X value) can be injected through GPIO or GPIO Controller (IOControlZ) registers. For example, the corrupting data X_value can be written at 110 by software through register access.

In this way, the corrupted value X_value will not reach the input combination hardwired logic and IPx input cannot be corrupted.

One or more embodiments may rely on the analysis of potential security issues inside SoC systems, with application of one or more embodiments adapted to be extended to other technical contexts where controllable hardware gating points, like Secure Link components, may provide an added value.

As indicated, one possible field of application of one or more embodiments may include SoC's with internal hardware partitions, where embedded cores may access separate IP subsets.

Such a scenario may also involve access to dedicated GPIO resources.

A system according to one or more embodiments, with a IP de-multiplexing feature, may facilitate achieving an higher degree of flexibility in system reconfiguration.

Figure 8:
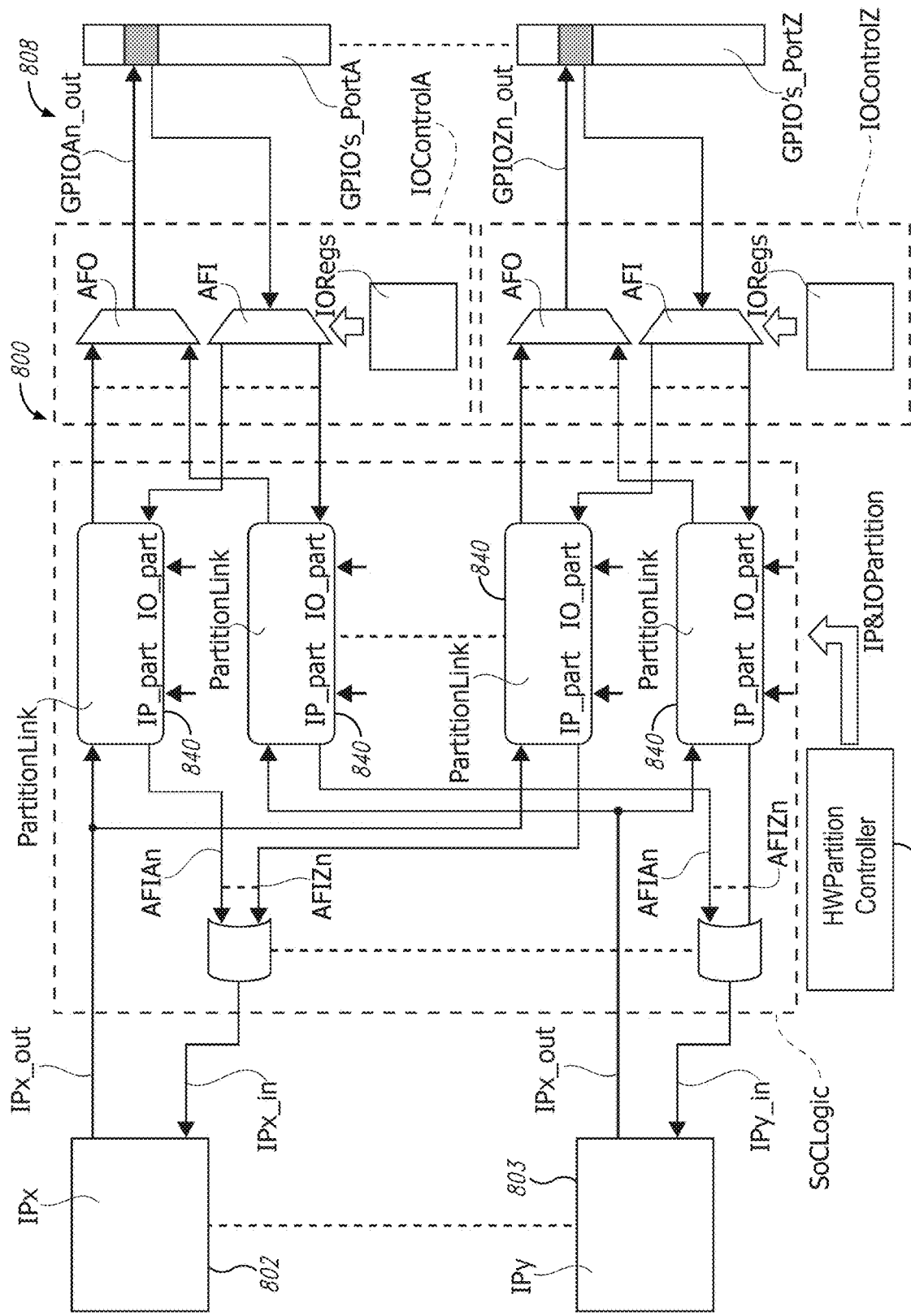
FIG. 8 is an exemplary embodiment of protection of a SoC system in the case of a hardware partitioning scenario.

FIG. 8 is exemplary of a system 800 of one such embodiment, wherein IPx 802 and 803 IPy may be physically connected to a same GPIO 808, through GPIO's Controllers (IOControl's blocks) 804 and through other components (e.g., so-called Partition Link blocks or circuits 840, such a designation being intended to distinguish their functionality over the Secure Link blocks in the embodiments discussed previously).

In this context, each Partition Link block 840 may manage the same data-path connection (IP output towards GPIO output, GPIO input towards IP input) as before, with gating of communication performed according to different information coming from the system.

In this scenario the control may be driven by number of the partition to which the IP/GPIO belongs, by allowing the connection if both have a same partition number (meaning IP and GPIO are included in the same partition), and gating (e.g., denying) the connection if partition numbers are different.

Partition information can be provided—in a manner known per se—by a specific SoC component or circuit (HW Partition Controller) 860 programmable or hardware specified.

In the case of programmability support by the Partition Controller 860, the adoption of a Partition Link solution as discussed previously may facilitate implementing a dynamically reconfigurable partitioned system, making it possible to provide a SoC with different hardware partitions according to software configuration.

Of course, without prejudice to the principles of the disclosure, the details of construction and the embodiments may vary widely with respect to what has been described and illustrated herein purely by way of example, without thereby departing from the extent of protection.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
one or more intellectual property (IP) cores;
one or more general purposes input/output (GPIO) interfaces, each GPIO interface having one or more ports; and
one or more security circuits, each security circuit being coupled between an IP core and a GPIO interface, wherein a security circuit, in operation, selectively enables communications between the IP core and the GPIO interface coupled to the security circuit based on an indication of the security status of the IP core, an indication of the security status of the GPIO interface or both the indication of the security status of the IP core and the indication of the security status of the GPIO interface, wherein the security circuit, in operation:
enables communication between the IP core and the GPIO interface when the indication of the security status of the IP core indicates the IP core is secure and the indication of the security status of the GPIO interface indicates the GPIO interface is secure;
enables communication between the IP core and the GPIO interface when the indication of the security status of the IP core indicates the IP core is not secure and the indication of the security status of the GPIO interface indicates the GPIO interface is not secure;

disables communication between the IP core and the GPIO interface when the indication of the security status of the IP core indicates the IP core is secure and the indication of the security status of the GPIO interface indicates the GPIO interface is not secure; and disables communication between the IP core and the GPIO interface when the indication of the security status of the IP core indicates the IP core is not secure and the indication of the security status of the GPIO interface indicates the GPIO interface is secure, wherein a memory of a security control circuit stores indications of the security statuses of the one or more IP cores and memories of GPIO control circuits of the GPIO interfaces store indications of the security statuses of the one or more GPIO interfaces.

2. The system according to claim 1 wherein the security circuit is part of a bi-directional communication channel between the IP core and a port of the GPIO interface.

3. The system of claim 2 wherein the security circuit, in operation, selectively enables communications between the IP core and the GPIO interface in both directions.

4. The system of claim 3 wherein the GPIO interface has a plurality of ports and, in operation, performs multiplexing/demultiplexing with respect to the plurality of ports.

5. The system of claim 1 wherein each communication channel between one of the IP cores and one of the GPIO interfaces includes one of the security circuits.

6. The system of claim 1 wherein the indications of the security statuses of the one or more IP cores and the indications of the security statuses of the one or more GPIO interfaces are software-programmable.

7. The system of claim 1 wherein each of the one or more ports of the GPIO interface has a respective security status and the security circuit, in operation, selectively enables a communication between the IP core and a port of the GPIO interface based on a security status of the port.

8. The system according to claim 1, wherein said security circuits include digital logic circuits.

9. The system of claim 1, comprising a System on Chip (SoC) including the one or more intellectual property (IP) cores, the one or more general purposes input/output (GPIO) interfaces, and the one or more security circuits.

10. The integrated circuit of claim 1 wherein the security circuit is coupled between the IP core and a second GPIO interface of the one or more GPIO interfaces, and the security circuit, in operation, selectively enables communications between the IP core and the second GPIO interface coupled to the security circuit based on the indication of the security status of the IP core, an indication of the security status of the second GPIO interface or both the indication of the security status of the IP core and the indication of the security status of the second GPIO interface.

11. The integrated circuit of claim 1 wherein the security circuit is coupled between a second IP core of the one or more IP cores and the GPIO interface, and the security circuit, in operation, selectively enables communications between the second IP core and the GPIO interface coupled to the security circuit based on an indication of the security status of the second IP core, the indication of the security status of the GPIO interface or both the indication of the security status of the second IP core and the indication of the security status of the GPIO interface.

12. The integrated circuit of claim 1 wherein the indication of the security status of the GPIO interface comprises indications of the security status of the one or more ports of the GPIO interface.

13. The system of claim 4 wherein the one or more IP cores comprises a plurality of IP cores, the one or more GPIO interfaces comprises a plurality of GPIO interfaces, and each communication channel between one of the IP cores and one of the GPIO interfaces includes one of the security circuits.

14. A system, comprising:
an integrated circuit, including:
one or more intellectual property (IP) cores;
one or more general purposes input/output (GPIO) interfaces, each GPIO interface having one or more ports; and
one or more security circuits, each security circuit being coupled between an IP core and a GPIO interface, wherein a security circuit, in operation, selectively enables communications between the IP core and the GPIO interface coupled to the security circuit based on an indication of the security status of the IP core, an indication of the security status of the GPIO interface or both the indication of the security status of the IP core and the indication of the security status of the GPIO interface; and
a peripheral device coupled to a port of the GPIO interface, wherein the security circuit, in operation:
enables communication between the IP core and the GPIO interface coupled to the security circuit when the indication of the security status of the IP core indicates the IP core is secure and the indication of the security status of the GPIO interface indicates the GPIO interface is secure;
enables communication between the IP core and the GPIO interface coupled to the security circuit when the indication of the security status of the IP core indicates the IP core is not secure and the indication of the security status of the GPIO interface indicates the GPIO interface is not secure;
disables communication between the IP core and the GPIO interface coupled to the security circuit when the indication of the security status of the IP core indicates the IP core is secure and the indication of the security status of the GPIO interface indicates the GPIO interface is not secure; and
disables communication between the IP core and the GPIO interface coupled to the security circuit when the indication of the security status of the IP core indicates the IP core is not secure and the indication of the security status of the GPIO interface indicates the GPIO interface is secure, wherein a memory of a security control circuit stores indications of the security statuses of the one or more IP cores and memories of GPIO control circuits of the GPIO interfaces store indications of the security statuses of the one or more GPIO interfaces.

15. The system of claim 14 wherein the peripheral device is a wireless communication circuit.

16. The system of claim 14 wherein the peripheral device is an automotive sensor.

17. The system of claim 14 wherein the security circuit, in operation, selectively enables communications between the IP core and a port of the GPIO interface in both directions.

18. The system of claim 14 wherein each communication channel between one of the IP cores and one of the GPIO interfaces includes one of the security circuits.

19. The system of claim 14 wherein the integrated circuit comprises a System on Chip (SoC).

20. The system of claim 14 wherein the security circuit is coupled between the IP core and a second GPIO interface of the one or more GPIO interfaces, and the security circuit, in operation, selectively enables communications between the IP core and the second GPIO interface coupled to the security circuit based on the indication of the security status of the IP core, an indication of the security status of the second GPIO interface or both the indication of the security status of the IP core and the indication of the security status of the second GPIO interface.

21. The system of claim 14 wherein the one or more IP cores comprises a plurality of IP cores, the one or more GPIO interfaces comprises a plurality of GPIO interfaces, and each communication channel between one of the IP cores and one of the GPIO interfaces includes one of the security circuits.

22. A method, comprising:
retrieving, by a security circuit of an integrated circuit coupled between an intellectual property (IP) core of the integrated circuit and a General Purpose Input/Output (GPIO) interface of the integrated circuit, an indication of the security status of the IP core from a memory of a security control circuit;
retrieving, by the security circuit, an indication of the security status of the GPIO interface from a control circuit of the GPIO interface; and
selectively enabling, by the security circuit, communications between the IP core and the GPIO interface based on the received indication of the security status of the IP core, the received indication of the security status of the GPIO interface or both the received indication of the security status of the IP core and the received indication of the security status of the GPIO interface, wherein the method comprises:
enabling communication between the IP core and the GPIO interface when the indication of the security status of the IP core indicates the IP core is secure and the indication of the security status of the GPIO interface indicates the GPIO interface is secure;
enabling communication between the IP core and the GPIO interface when the indication of the security status of the IP core indicates the IP core is not secure and the indication of the security status of the GPIO interface indicates the GPIO interface is not secure;
disabling communication between the IP core and the GPIO interface when the indication of the security status of the IP core indicates the IP core is secure and the indication of the security status of the GPIO interface indicates the GPIO interface is not secure; and
disabling communication between the IP core and the GPIO interface when the indication of the security status of the IP core indicates the IP core is not secure and the indication of the security status of the GPIO interface indicates the GPIO interface is secure.

23. The method of claim 22, comprising:
updating the indication of the security status of the integrated circuit; and
updating the indication of the security status of the GPIO interface.

24. The method of claim 22, comprising:
receiving, by the security circuit, an indication of the security status of a second GPIO interface coupled to the security circuit; and
selectively enabling, by the security circuit, communications between the IP core and the second GPIO interface based on the received indication of the security status of the IP core, the received indication of the security status of the second GPIO interface or both the received indication of the security status of the IP core and the received indication of the security status of the second GPIO interface.

* * * * *

UNITED STATES PATENT AND TRADEMARK OFFICE
CERTIFICATE OF CORRECTION

PATENT NO. : 11,144,678 B2  
APPLICATION NO. : 15/916067  
DATED : October 12, 2021  
INVENTOR(S) : Mirko Dondini et al.

Page 1 of 1

It is certified that error appears in the above-identified patent and that said Letters Patent is hereby corrected as shown below:

On the Title Page

Item (73) Assignees:
"STMICROELECTRONICS S.r.l.;" should read, --STMICROELECTRONICS S.r.l., Agrate Brianza (IT);--.
"STMICROELECTRONICS (ROUSSET) SAS" should read, --STMICROELECTRONICS (ROUSSET) SAS, Rousset (FR)--.

Signed and Sealed this  
Nineteenth Day of April, 2022

Katherine Kelly Vidal  
*Director of the United States Patent and Trademark Office*